G. WEINTRAUB.
REFRACTORY ARTICLE.
APPLICATION FILED MAR. 24, 1910.

1,022,011.

Patented Apr. 2, 1912.

Witnesses:
Marcus L. Byng.
J. Ellis Glen.

Inventor:
George Weintraub,
by Albert G. Davis
His Attorney.

UNITED STATES PATENT OFFICE.

GEORGE WEINTRAUB, OF LYNN, MASSACHUSETTS, ASSIGNOR TO GENERAL ELECTRIC COMPANY, A CORPORATION OF NEW YORK.

REFRACTORY ARTICLE.

1,022,011.     Specification of Letters Patent.     Patented Apr. 2, 1912.

Application filed March 24, 1910. Serial No. 551,380.

*To all whom it may concern:*

Be it known that I, GEORGE WEINTRAUB, a subject of the Czar of Russia, residing at Lynn, in the county of Essex, State of Massachusetts, have invented certain new and useful Improvements in Refractory Articles, of which the following is a specification.

The present invention relates to the manufacture of hollow articles, such as crucibles, tubes, and the like from refractory materials. In accordance therewith strong and homogeneous articles can be made from oxids, such as magnesia, alumina, thoria, or other highly refractory substances, without the use of a binder. The refractory material is heated to a temperature high enough to sinter, or even melt the same in a mold so arranged as to permit the walls of the formed article to contract upon cooling.

Figure 1:
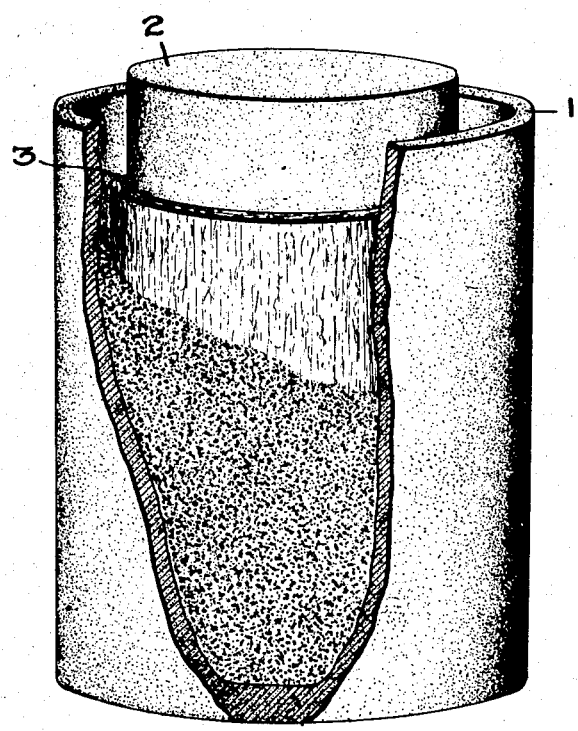
Figure 2:
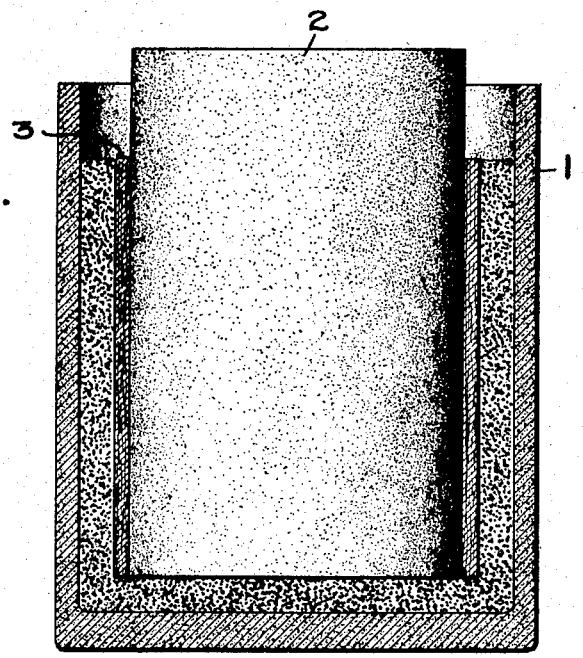

In the accompanying drawing, Figure 1 is a perspective view showing the mold, the outer wall being shown partly broken away, and Fig. 2 is a longitudinal section of the same.

To illustrate my invention, I will describe as an example, the preparation of a magnesia crucible. The magnesium oxid is preferably first heated in an electric furnace to a high temperature in order to subject the same to approximately the same conditions as when forming a crucible, thereby causing the material to assume a stable condition, and thus any very considerable shrinkage of the material in the mold is avoided. This firing treatment usually causes the oxid to cake together and regrinding is therefore necessary. The oxid is ground to the fineness of flour in a suitable mill, such as a ball mill, and is then ready to be used in a mold.

The mold consists of highly refractory material, such as carbon or graphite. A layer of the finely powdered magnesia is placed in the bottom of the crucible 1, the thickness of the layer corresponding, of course, to the desired thickness of the bottom desired in the finished crucible. A carbon or graphite rod or plug 2 is now placed centrally in the crucible upon this magnesia layer and serves as a core, its diameter being determined by the desired inside diameter of the crucible. The core is surrounded by a layer of material 3 which will leave a compressible residue stable at the temperature to which the magnesia is to be heated. Such a material is paper, which chars and forms a layer of loose carbon. The thickness of this paper layer may be varied in accordance with the size of the mold. As a matter of illustration, I may say that when molding a crucible of $2\frac{1}{2}''$ inside, diameter a thickness of paper varying between $\frac{1}{16}$ to $\frac{1}{8}$ inch is suitable. The space between the walls of the mold 1 and the paper covered core 2 is now filled with calcined magnesia powder. The powder is evenly distributed and packed to a certain degree by shaking and bumping. No mechanical pressure is required, but of course it can be applied to some degree. When the annular space has been filled to a height corresponding with the desired height of the walls of the magnesia crucible, the mold is placed within a suitable electric or other furnace and subjected to a temperature high enough to sinter, or even to some degree melt the magnesia. I have found a temperature of about 1500 degrees C. was sufficient for this purpose when working with magnesia. This firing temperature will vary, of course, with the character of the refractory material employed. When the mold with its charge cools, the walls of the magnesia crucible contract upon the layer of loose carbon surrounding the core, and thus rupture or cracking of the walls is avoided. When cooled the core 2 may be easily removed from the crucible, which can then be slipped out of the outer mold 1. The same mold can be used a number of times in a similar way. The finished crucibles are smooth, homogeneous and strong, may be safely handled and may even be worked on the lathe. By this method crucibles, or tubes of large size with comparatively thin walls may be easily and cheaply made.

What I claim as new and desire to secure by Letters Patent of the United States, is—

1. The process of making hollow structures of refractory material, which consists in finely dividing such material, molding it in its loose state to the required shape around a rigid core covered with compressible material and sintering the refractory material whereby the hollow structure thus obtained is allowed to contract upon cooling without fracturing.

2. The process of making hollow vessels of refractory materials, which consists in confining said materials in pulverulent form in a suitable mold, providing space for the shrinkage of the finished vessel and sintering said refractory material into coherent form by the application of heat.

3. The process of making coherent masses of refractory oxids, which consists in confining said oxids in pulverulent condition between annular, relatively movable refractory retaining walls, the inner of said walls being covered with a coating of compressible material, and heating said material to the sintering temperature.

4. The process, which consists in lining the inner wall of an annular container with yieldable material, placing a refractory powder in said container, and heating said container and contents to the sintering temperature.

5. The process of making hollow vessels of magnesia which consists in firing the magnesia to substantially the sintering temperature, grinding the calcined material, confining the same when ground in a mold, while providing space for the shrinkage of the finished vessel, and sintering said material by heating to a temperature of about 1500° C.

In witness whereof, I have hereunto set my hand this twenty second day of March, 1910.

GEORGE WEINTRAUB.

Witnesses:
ALEX. F. MACDONALD,
JOHN A. MCMANUS, Jr.